United States Patent [19]

Pembrook et al.

[11] 3,926,527
[45] Dec. 16, 1975

[54] ROTATING GAS CORRELATION CELL

[75] Inventors: John D. Pembrook, Costa Mesa; Darrell E. Burch, Orange City; Francis J. Gates, Costa Mesa, all of Calif.

[73] Assignee: Philco-Ford Corporation, Blue Bell, Pa.

[22] Filed: June 5, 1974

[21] Appl. No.: 476,373

[52] U.S. Cl. ............... 356/246; 250/339; 250/351; 356/51; 356/188; 350/274; 350/319
[51] Int. Cl.² .................... G01N 1/10; G01J 3/48
[58] Field of Search ...... 356/51, 188, 246; 250/339, 250/343, 344, 345, 349, 350, 351; 350/273, 274, 319

[56] References Cited
UNITED STATES PATENTS

| | | | |
|---|---|---|---|
| 3,090,861 | 5/1963 | Haenni | 356/246 |
| 3,552,865 | 1/1971 | Leung et al. | 356/246 |
| 3,588,496 | 6/1971 | Snowman | 356/51 |
| 3,723,731 | 3/1973 | Blau, Jr. | 356/51 |
| 3,729,264 | 4/1973 | Simazaki et al. | 350/274 |
| 3,793,525 | 2/1974 | Burch et al. | 350/343 |

*Primary Examiner*—Vincent P. McGraw
*Attorney, Agent, or Firm*—Robert D. Sanborn

[57] ABSTRACT

A rotating gas cell structure, intended for use in non-dispersive electro-optical measurement equipment, includes at least a pair of chambers that, by virtue of rotation of the structure, are alternately inserted into a beam of radiant energy. The chambers contain a quantity of gas of the species to be analyzed at different pressure values. When used in a non-dispersive radiant energy gas analyzer, the rotating cell will modulate the radiant energy in a way that permits a sensitive and accurate evaluation of a particular gas in a sample region. If desired the cell structure can include a built-in chopper to improve gas detection performance. In an alternate embodiment one of the chambers can be replaced by a radiant energy attenuator. Gas filling and sealing means for the cell chambers are disclosed.

7 Claims, 12 Drawing Figures

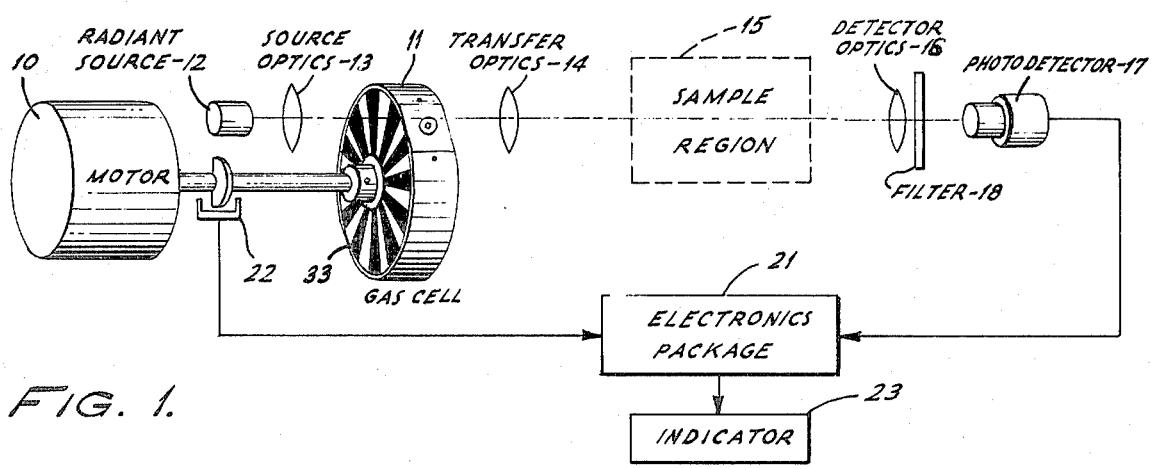
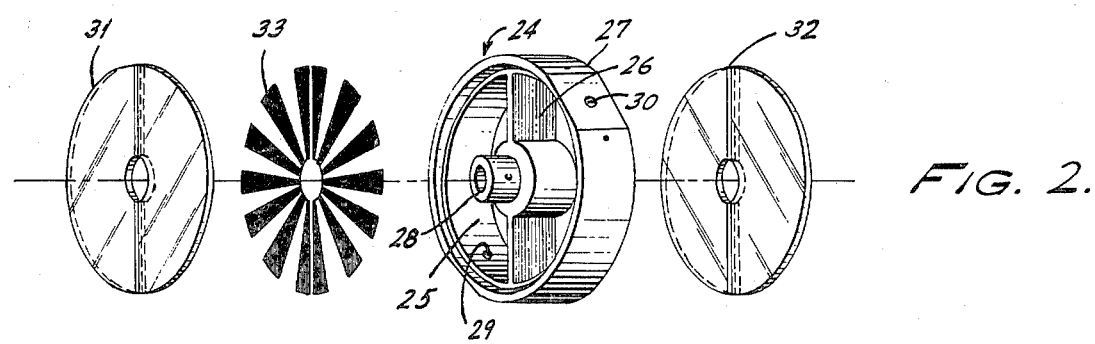
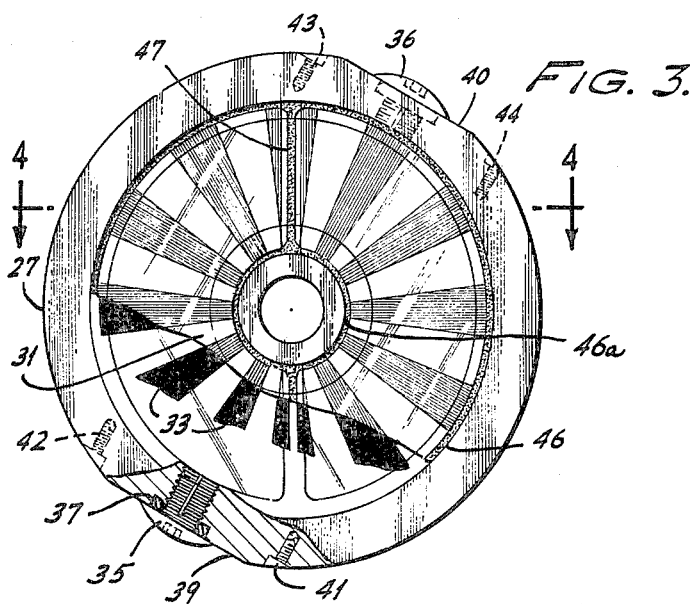
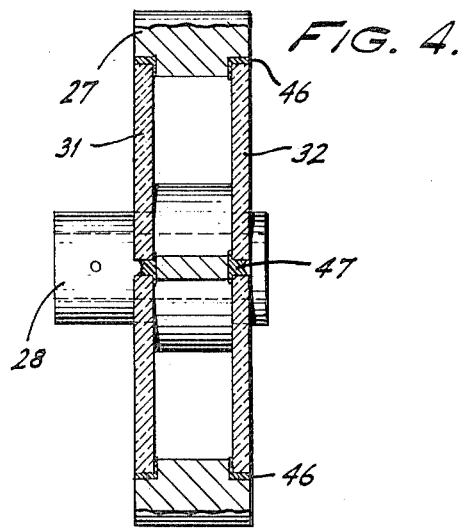
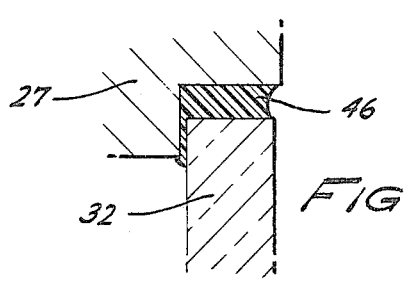
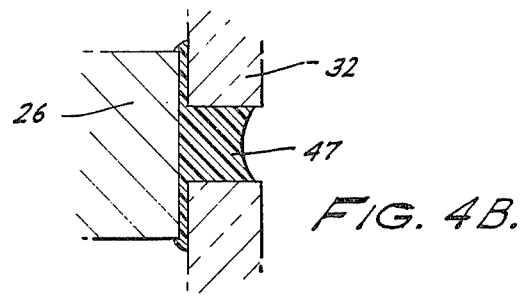

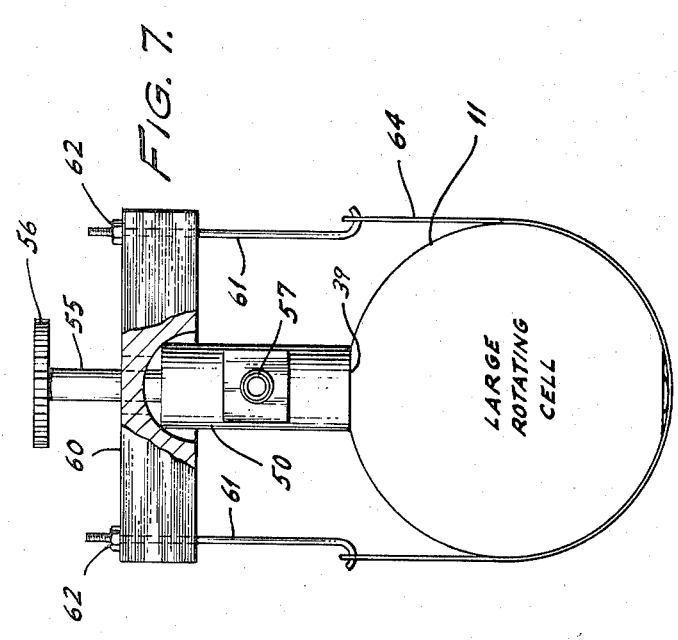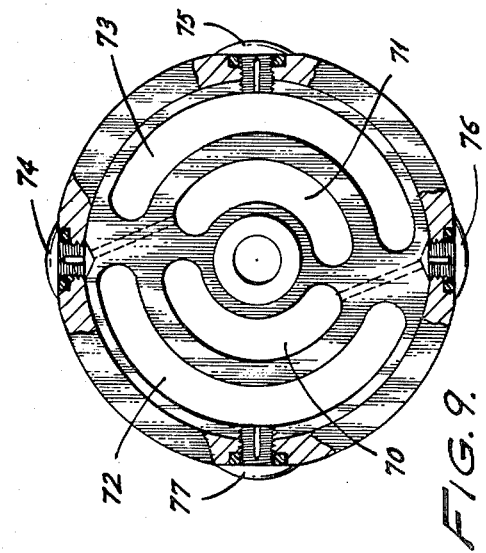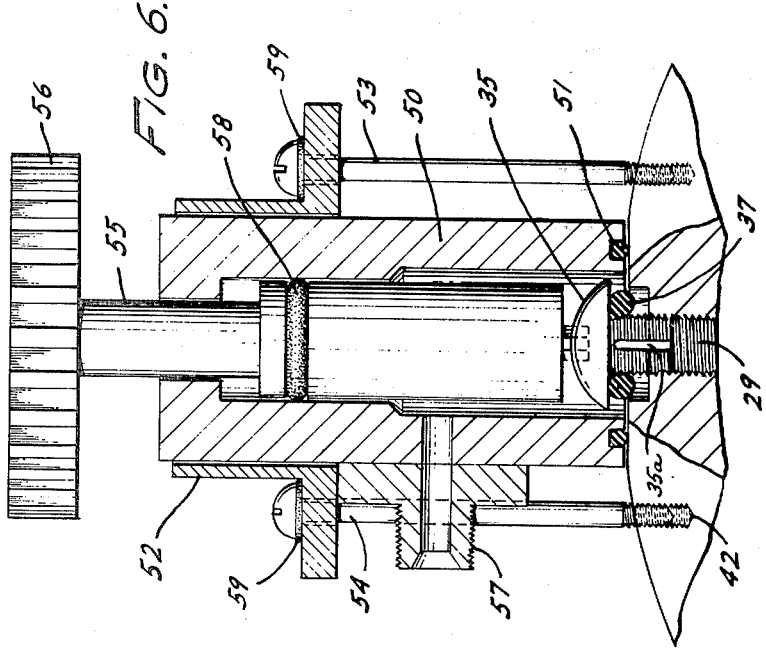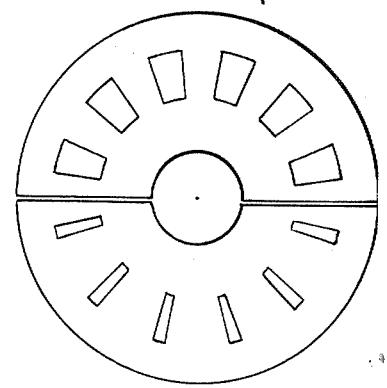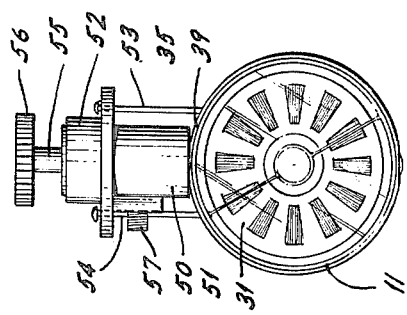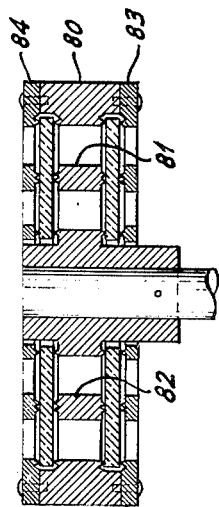

ROTATING GAS CORRELATION CELL

BACKGROUND OF THE INVENTION

U.S. Pat. No. 3,793,525 was issued to Darrell E. Burch, David A. Gryvnak, and John D. Pembrook on Feb. 19, 1974, and is titled Dual Cell Non-Dispersive Gas Analyzer. The patent is directed to an instrument for measuring small quantities of gas in a sample region in the presence of other gases that would ordinarily interfere with radiant energy absorption measurements. One of the elements is a rotating gas cell assembly that alternately inserts one and then the other of a pair of chambers into a beam of radiant energy which is thereby modulated by the cell assembly when the gas to be detected is present within the sample cell. The nature of the modulation can be measured by an electronic circuit and related to the quantity of gas in the sample region.

SUMMARY OF THE INVENTION

It is an object of the invention 80 provide a rotating gas cell structure useful in radiant energy non-dispersive gas analyzers, wherein the cell has the desired radiant energy transmission properties and is of a rugged, controlled-fill, hermetically-sealed form.

It is a further object of the invention to incorporate a chopper into the integral structure of a rotating gas cell.

It is a still further object of the invention to incorporate an attenuator into one chamber of a two chamber rotating gas cell structure.

It is a still further object of the invention to provide a rotating gas cell structure with readily accessible gas fill means that can be securely and easily sealed.

These and other objects are achieved in the following manner. A cylinder-shaped wheel, having two isolated chambers extending therethrough, has flat transparent windows bonded to the flat faces to close off the chambers. The two chambers are filled with gas of the species to be detected, the two chambers being at different pressures. A multiple blade chopper is associated with the gas cell so that radiant energy passing therethrough will be chopped at a multiple of the cell rotation rate. In an alternate embodiment only one chamber is filled with gas. The other chamber is either evacuated or filled with a non-absorbing gas, and its associated window area incorporates a neutral density filter or attenuator.

The gas cell is provided with means for filling and sealing off of the chambers. This includes removable closure seals and a filling accessory.

BRIEF DESCRIPTION OF THE DRAWING

FIG. 1 shows a rotating two-chamber cell and the basic elements of an operating gas detection system;

FIG. 2 is an exploded view of a cell showing the various parts;

FIG. 3 is a view of the face of the rotating cell structure;

FIG. 4 is a cross sectional view of the cell of FIG. 3 found along the line 4—4 of FIG. 3;

FIG. 4A shows in detail the window seal at the window periphery;

FIG. 4B shows in detail the window seal along the split window edge;

FIG. 5 shows a cell with an attached gas fill accessory;

FIG. 6 is a cross section view of the gas fill accessory and the fill portion of a chamber of the gas cell;

FIG. 7 shows an alternative means for fill accessory attachment;

FIG. 8 shows a chopper modified to provide the attenuator function;

FIG. 9 shows a four-chamber gas cell for two-beam operation; and

FIG. 10 is a cross section view of a four-chamber gas cell using captive windows for gas pressure greater than one atmosphere.

DESCRIPTION OF THE INVENTION

FIG. 1 shows the basic elements of an optical non-dispersive gas analyzer system. A motor 10 rotates a dual-chamber gas cell 11 at a suitable rate, for example 1800 r.p.m. While speed is not critical, a synchronous motor is an expedient method of maintaining the speed constant. A suitable source of radiant energy 12 has its output formed into the desired beam shape by means of source optics 13. The radiant energy is passed through gas cell 11 and then through transfer optics 14. The radiant energy is then passed through sample region 15 where the gas to be analyzed is located. The radiant energy is then focused by detector optics 16 onto photodetector 17. Filter 18 has a pass band chosen for the particular gas to be analyzed and confines the system radiant energy response to a particular spectral region. It is best to locate filter 18 somewhere between the sample region 15 and the photodetector 17.

Gas cell 11 has on its optical input side an array of opaque regions 33 that constitute a chopper. Typically twelve opaque sectors alternate with clear sectors of equal width. The radiant energy beam at the gas cell is made smaller, by virtue of the optics, than the width of the sectors. Therefore as the gas cell rotates, the radiant energy will be chopped at a rate twelve times the rotation rate. For the example shown, the pair of chambers in the gas cell 11 will be interposed in the radiant energy beam at a 30 Hz rate and the beam will be chopped at a 360 Hz rate.

The output of photodetector 17 will comprise a signal having a 360 Hz component and, depending upon the gas in the sample region, a 30 Hz component. These signals are fed to an electronics package 21 which is also fed a 30 Hz reference signal from pickup 22 which senses the rotation of gas cell 11. The reference signal will bear a specific phase relationship with respect to the 30 Hz photodetector signal component and can be used in a synchronous detection circuit. The electronics package processes the electrical signals and drives an indicator 23 which can be calibrated in terms of the concentration of the gas to be analyzed in sample region 15. The nature and details of the measurement are described in above-mentioned U.S. Pat. No. 3,793,525. Accordingly, further details are not required here.

FIG. 2 is an exploded view of gas cell 11. The cell is constructed around a stainless steel body 24 which is machined to shape and heat treated for stress relief. The body 24 includes open chambers 25 and 26, an outer rim 27, and a central hub 28. Hub 28 will include means such as a set screw or roll pin hole to permit securing the device to a drive shaft. Rim 27 contains fill ports 29 and 30. The width of the material separating chambers 25 and 26 is made as narrow as possible while yet providing a sufficiently rugged support for the gas cell. Windows 31 and 32, desirably split into two parts each as shown, are sealed to the recessed faces of body 24 so as to seal off chambers 25 and 26. The window seal can be accomplished by means of epoxy, glass frit, or solder glass seals, or any of the well-known hermetic glass to metal seal techniques. The windows 31 and 32 are desirably made of sapphire and are faced on both sides with an anti-reflective coating designed for the wavelengths of interest.

The chopper blades should be oriented to align as shown over the body portion separating chambers 25 and 26. Chopper 33 can be cut from thin metal shim stock or high density photographic film material and cemented to window 31 prior to sealing. Since the window is split, the chopper is split to conform. If the window were to be made in a single piece the chopper preferably would also be a single structure. In a preferred chopper construction, a layer of metal such as Inconel, a well-known nickel-chromium alloy, is deposited on window 31 in the desired pattern. The metal layer is made thick enough to reduce transmission at the wavelength of interest to about 2% or less. Such metal deposition and patterning processes are well-known and will not be further detailed here.

The chopper is shown on the inside of window 31. This seals the chopper away from the atmosphere and protects it from handling. While this is preferred, the chopper can be located on the outside of window 31. Although chopper 33 is illustrated on the source side of cell 11, alternatively the chopper may be placed on the photodetector side of cell 11. The optimum location of chopper 33 may vary for different configurations of source and transfer optics 13 and 14.

FIG. 3 is a front view of gas cell 11, cut away at three levels to show construction. The upper portion of FIG. 3 shows the exterior view of split window 31. In the lower portion the window is cut away to reveal the exposed chopper 33. The chopper is cut away still lower in the drawing to reveal the cell interior and a view of opposing window 32. The bottom cut away is into rim 27 to show the fill port construction. Rim 27 has a step in its periphery to seat window 31 which is shown split as in FIG. 2. Epoxy seals extend completely around the edges of the window elements, as shown at 46, 46a, and 47, to hold the window in place. Fill ports 29 and 30 are shown closed with screws 35 and 36 respectively. These screws are typically No. 10-32 with an Allen button-head and a slotted shank. O-rings such as the one shown at 37 are located under the screw heads so that when the screws are tightened, the O-rings are compressed into their recesses and act as a seal. The screws are tightened until the inside metal face of the screw head makes firm contact with the outside metal face of the cell rim 27. When screws 35 and 36 are loosened or partly backed out, the slotted shanks provide gas-flow communication between the sealed off chambers and the cell exterior. Thus the screws act as sealing valves for chamber filling and/or evacuation.

The fill ports are surrounded with flat milled surfaces 39 and 40. These surfaces are designed to accommodate a gas fill accessory to be described below. In addition four drilled and tapped holes 41 through 44 are provided to permit attachment of the gas fill accessory.

FIG. 4 is a section of the cell of FIG. 3 taken at the line 4—4. The expanded detail sections of FIGS. 4A and 4B show the window seals. The window 32 fits into the recessed rim of the metal body, and epoxy (or other material) seals 46 and 47 join the window to the body in hermetic relationship. The peripheral window seal 46 is shown in detailed cross section in FIG. 4A. The seal of the hub, designated 46a is similar to seal 46. As noted above, a single window could be sealed to each face but the split version shown is preferred. This is due to the fact that the split window construction provides a more reliable hermetic seal as can be seen at the central detail of FIG. 4B. If a single window were to be employed, the bead of epoxy at 47 would not be present. Instead, a single layer of material would cement the window to the metal body. If a leak were to develop at such a seal it would tend to equalize the pressures of the gas in the two cell chambers. Using the split window construction increases the seal volume thereby making the seal more reliable. Furthermore, if a small leak were to develop it would most likely be to the exterior of the cell and not between chambers. Such a leak can be repaired from outside of the cell and is therefore a more desirable alternative.

In making a reliable epoxy seal the following process can be employed. First, all coatings are removed from the periphery or seal area of the sapphire window and the window and body are carefully cleaned. Then a flexible epoxy-polyamide adhesive such as an equal mixture of EPON 828 (Shell brand) and POLYAMIDE VERSAMIDE 140 (General Mills brand) is dispensed along the seal areas of the stainless steel body and the window is pressed into place. Air bubbles are removed from the adhesive by centrifuging or by heating the mixture before applying the adhesive. The cure of the adhesive is accelerated by placing the assembly in an oven at a temperature of about 115°F. It is desirable to cure the adhesive at approximately the temperature that the cell will experience during operation of the gas analyzer. This minimizes stresses between the windows and the cell body due to different thermal expansion coefficients of the different materials. The second or opposite window is sealed in a duplicate process. Cells fabricated as outlined above have produced excellent long term service and have shown virtually no tendency to leak.

FIGS. 5 and 6 show a gas fill accessory located adjacent to the fill device of a gas cell 11. FIG. 6 is a cross section of the gas fill accessory of FIG. 5. The barrel 50 of the fill device has an O-ring 51 recessed into its open end to engage the flat surface 39 on the cell. Collar 52 contains mounting screws 53 and 54 which engage holes 41 aand 42 (see FIG. 3). When these screws are tightened, the open end of barrel 50 is pressed in gas tight relationship with surface 39. Sliding and rotating wrench 55, manipulated by handle 56, can be operated to loosen screw 35 thereby allowing the gas cell chamber to communicate with the inner bore of barrel 50 and gas line fitting 57. The accessory is shown in position on the cell. The sliding and rotating wrench 55 is shown in position on screw 35. The wrench is made gas tight by means of O-ring 58. It can be seen that the bore of gas fitting 57 is in direct communication, via the inner bore of cylinder 50 and the slot 35a in screw 35, with the interior of the gas cell. Fitting 57 can be connected to various gas sources or vacuum (not shown) so that the cell can be provided with a gas or mixture of gases at any desired pressure or partial pressure. After the desired atmosphere is achieved inside the cell, wrench 55 is used to tighten screw 35 so that O-ring 37 acts to seal off the filling aperture 29.

O-rings 59 can be employed if desired to act as cushions under the mounting screws 53 and 54 to prevent excessive stresses from being applied to the fill accessory and to the cell body.

FIG. 7 shows an alternate means for holding a gas filling accessory against a cell for filling. Apertured block 60 fits over barrel 50 to press it against the gas cell flat 39. Hook bolts 61 and nuts 62 draw strap 64 so that it bears against cell 11 to provide the necessary pressure. While FIG. 7 relates to a large diameter gas cell, a smaller cell version can be pressed against the gas fill accessory with the same device. The wrench 55 and manipulation of filling is as was described in connection with FIGS. 5 and 6.

The showing of the rotating gas cell has thus far included two chambers and it was intended that samples of the gas species to be detected could be inserted and sealed into the cell at suitable density and pressure as described in U.S. Pat. No. 3,793,525. It is possible in many cases to operate the system with gas in only one cell chamber and to provide the other chamber with a neutral density attenuator. The attenuation is adjusted to equal the average attenuation of the gas cell it replaces over the pass band of the system as established by filter 18 of FIG. 1. In this case it is preferred to coat that portion of the cell window 31 associated with the empty chamber with a thin layer of metal, such as Inconel, as described in connection with the chopper 33 coating. However the metal is made sufficiently thin to provide only the attenuation required. For example, referring to FIG. 3, if the right hand chamber of the cell is filled with a sample of the gas species to be detected, the left hand chamber is either evacuated or filled with a gas or other material that does not absorb in the wave band of interest. The left hand of window 31 is then provided with the above described neutral density filter.

FIG. 8 shows a modified chopper structure designed to avoid the above described neutral density filter. The shape shown is to replace the showing in FIG. 2 as element 33. The opaque sectors are made wider on the side of the cell that requires attenuation. The reduced aperture provides the required attenuation and the relative sector size in the two halves is adjusted to provide the desired attenuation value.

FIG. 9 shows a four-chamber version of the rotating gas cell structure. Four gas fill vents and closure screws are employed as was described for the two chamber structure described above. Chamber 70 is sealed at closure screw 76, chamber 71 is sealed at closure screw 74, chamber 72 is sealed at closure screw 77, and chamber 73 is sealed at closure screw 75. In this device two light beams will be employed. The two inner chambers 70 and 71 will modulate the inner beam (not shown) while a second or outer beam (not shown) will be modulated by the outer two chambers 72 and 73 when the gases to be detected are present within the sample cell. Thus two completely separate gas measurement systems can be operated from a single rotating gas cell structure and motor combination.

The cells shown and described above are designed for gas filling in the pressure range up to about one atmosphere. If it is desired to employ a high pressure gas fill, an alternative cell construction is preferred. FIG. 10 shows a cell construction designed for pressures that can substantially exceed one atmosphere. In FIG. 10 a cross section of a four-chamber cell is taken across a diameter. The cell body is in three parts. The central portion 80, which includes the rotating hub, has recesses to accommodate the windows. The recesses in the body 80 are made slightly deeper than the thickness of the windows. The space between the window and the cell body and the space between the window and the cell end cap are filled with epoxy. The epoxy between the window and the cell body forms an hermetically-sealed chamber. The epoxy between the window and the cell end cap fills any void between the two elements. The cell end caps are bolted into place before the epoxy has cured. The hermetic seal is accomplished by the epoxy layer. The window is held in place against the gas pressure within the cell by the cell end cap.

It is desirable to make the two epoxy layers very thin to precisely locate the window within the cell structure. It is also desirable to make the two epoxy layers relatively thick to provide enough volume of epoxy to form a reliable seal. The cell structure illustrated in FIG. 10 incorporates both desirable features. This is done by machining recesses into both the cell body 80, 81, 82 and the cell end caps 83 and 84 to accommodate thick layers of epoxy. Small portions of opposing surfaces of the cell body and the cell end caps are left to locate the window within the completed structure.

A person skilled in the art will see various alternatives to the embodiments shown. It is clear that other assembly techniques are available and other closure and gas fill means could be employed. For example, gas fill holes including a tapered section could be used with deformable metal or plastic balls and slotted set screws to provide closure. Also any of the closure devices could be augmented with sealing compounds or cements. Accordingly, it is intended that the invention be limited only by the following claims.

We claim:

1. A rotating gas correlation cell for use in a nondispersive gas analyzer, said cell comprising:

a cylindrical housing having an outer rim and an axial collar, said collar including means for attaching said housing to a shaft operative to rotate said cylinder about its axis of symmetry, a pluralilty of apertures extending through said housing parallel to and on opposite sides of the axis of said cylinder, window means sealed to the end faces of said housing to close said apertures off into sealed compartments, said compartments being adapted to contain a quantity of gas through which radiant energy can be passed by way of said windows, at least one of said windows having associated therewith a series of radial sectors of high optical attenuation material, said sectors acting periodically to interrupt said radiant energy as said cell is rotated, fill means extending into said compartments and through said outer rim whereby said gas can be injected into said compartments and means for selectively opening and closing said fill means.

2. The cell of claim 1 wherein said sectors comprise material adhered to said window.

3. The cell of claim 1 wherein said sectors comprise metal deposited onto said window.

4. The cell of claim 1 wherein one of said compartments is filled with a material that does not appreciably attenuate said radiant energy and the window area associated with said one of said compartments is at least partially covered with radiant energy attenuating material having neutral density.

5. The cell of claim 1 wherein one of said compartments is filled with a material that does not appreciably attenuate said radiant energy and said sectors are made wider over the window area associated with said one of said compartments than said sectors over the remainder of said window, said sectors being made of sufficiently different width to achieve a desired reduction in average radiant energy transmission.

6. The cell of claim 1 wherein four compartments are present and two beams of radiant energy are employed, two of said compartments being located at a first radial distance from the rotational axis of said cell, the other two of said compartments being located at a second and greater radial distance from the rotational axis of said cell.

7. The cell of claim 1 wherein said fill means for each compartment comprises a screw having a threaded shank portion threadedly engaged in a threaded hole in said outer rim and a head portion larger in diameter than said shank portion, said shank portion being formed with a longitudinally extending slot providing a passage from the exterior of said rim to said compartment, and an O-ring surrounding said shank and lying between said head portion and said rim, said O-ring sealing said fill means as said screw is tightened.

* * * * *